United States Patent [19]

Viazanko

[11] Patent Number: 5,134,896
[45] Date of Patent: Aug. 4, 1992

[54] ROLLER LINKAGE

[76] Inventor: Thomas J. Viazanko, 13997 Brady, Redford, Mich. 48239

[21] Appl. No.: 360,328

[22] Filed: Jun. 2, 1989

[51] Int. Cl.⁵ .................... G05G 11/00; G05G 1/04
[52] U.S. Cl. .................... 74/483 R; 74/483 PB; 74/526; 74/527
[58] Field of Search .......... 74/526, 527, 483 R, 74/483 PB, 477, 479

[56] References Cited

U.S. PATENT DOCUMENTS

| | | |
|---|---|---|
| 1,802,975 | 4/1931 | Kintzele . |
| 2,647,166 | 7/1953 | Lens .................... 74/483 |
| 2,965,169 | 12/1960 | Berghell .................... 74/483 |
| 3,355,558 | 11/1967 | Geese et al. .................... 74/483 |
| 3,842,689 | 10/1974 | Bagge .................... 74/479 |
| 4,031,340 | 6/1977 | Pastorel .................... 74/483 R X |
| 4,541,299 | 9/1985 | Kanaya et al. .................... 74/493 |
| 4,550,628 | 11/1985 | Yarnell .................... 74/483 R X |

*Primary Examiner*—Vinh T. Luong
*Attorney, Agent, or Firm*—Reising, Ethington, Barnard, Perry & Milton

[57] ABSTRACT

A roller linkage assembly (10) of the type for positively locking a traveling rail member (18). The assembly (10) includes a housing (22). The housing has a passageway (24, 26, 28) therethrough. A plurality of rollers (30, 32, 34) are moveably disposed in the passageway (24, 26, 28). An actuation cylinder (14) has a piston (16) extending outwardly therefrom for movement in the passageway (24). The piston (16) surrounds a first roller (30) for positively moving the same in response to a force applied by the actuation cylinder (14). When the cylinder (14) is energized, the first roller (30) is moved to a locked condition. This forces a second roller (32) to its locked condition. Finally, the force is transmitted to a third roller (34) and the third roller (34) engages a notch (36) in the traveling rail member (18) to prevent movement of the same. When the assembly (10) is in the locked condition, no forces are transmitted from the rail (18) to the piston (16).

9 Claims, 2 Drawing Sheets

ROLLER LINKAGE

BACKGROUND OF THE INVENTION

1. Field Of The Invention

The present invention relates to a linkage assembly for locking a traveling rail. More particularly, the present invention relates to a roller linkage for selectively locking the traveling member.

2. Description Of The Prior Art

It is often desirable to lock a traveling member to prevent movement of the traveling member. One such an example is an industrial weld gun apparatus. Typically, the weld gun is fixedly secured on a rail. The rail extends from a housing and is moveable with respect thereto to position the weld gun in the appropriate location to preform its welding function. Once the rail and gun are extended to the desired location, the rail member is stopped to prevent movement thereof with respect to the housing while performing the welding function. Typically, the rail is positioned and locked by electronic controls. These electronic controls are expensive and not effective to keep the rail locked in the event of a power failure.

The U.S. Pat. No. 4,541,299 to Kanaya et al discloses a roller linkage assembly for transmitting forces to secure a traveling member and prevent relative movement between two members. Specifically, the Kanaya patent shows a telescoping steering shaft assembly. An upper shaft extends from a cylindrical portion of a lower shaft. The upper shaft telescopes relative to the lower shaft to permit telescopic movement of the steering assembly. An actuator handle is connected to an actuator rod. The actuation rod imparts a force on a plurality of spherical rollers. When actuated, the spherical rollers which are housed in the upper shaft engage the cylindrical portion of the lower shaft to prevent relative telescoping movement between the upper shaft and the cylindrical portion of the lower shaft. When in the locked position, forces upon the upper or lower shaft are transmitted to the actuator rod.

U.S. Pat. No. 1,802,975 to Kintzele issued Apr. 28, 1931 discloses an assembly for locking one member with respect to a second member. Specifically, the assembly includes a locking mechanism for preventing relative movement between a traveling member and a fixed member. The traveling member includes a plurality of spherical rollers housed in a housing. An actuator member imparts a force to the spherical rollers which engage a stationary member. When the actuator is moved, thereby moving the roller into the stationary member, the traveling member is locked and can not move relative to the stationary member. Any force imparted to the stationary or moveable members is transmitted through the rollers and to the actuator.

SUMMARY OF THE INVENTION AND ADVANTAGES

According to the present invention, there is provided a roller linkage assembly of the type for locking a traveling member which comprises actuating means for moving between a locked and unlocked position. The assembly further includes traveling rail means for movement when the actuating means is in the unlocked position. The traveling rail means is stationary when the actuating means is in the locked position. The assembly is characterized by including locking means disposed between the actuating means and the traveling rail means for locking engagement with the traveling rail means in response to the actuating means being moved to the locked position. The locking means maintains the traveling rail means in the locked position independently of the actuating means when the actuating means is in the locked position.

Accordingly, there is provided a roller linkage assembly which provides a means for locking a traveling rail member with respect to a housing to prevent movement of the traveling rail member. Furthermore, when the assembly is in the actuated or locked position, all forces applied from the traveling rail member to the linkage assembly are prevented from being transmitted to the actuator. That is, there is no force on the actuator when the assembly is in the locked position. This allows the assembly to remain in the locked position in the event of a power loss.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENTS

Figure 1:
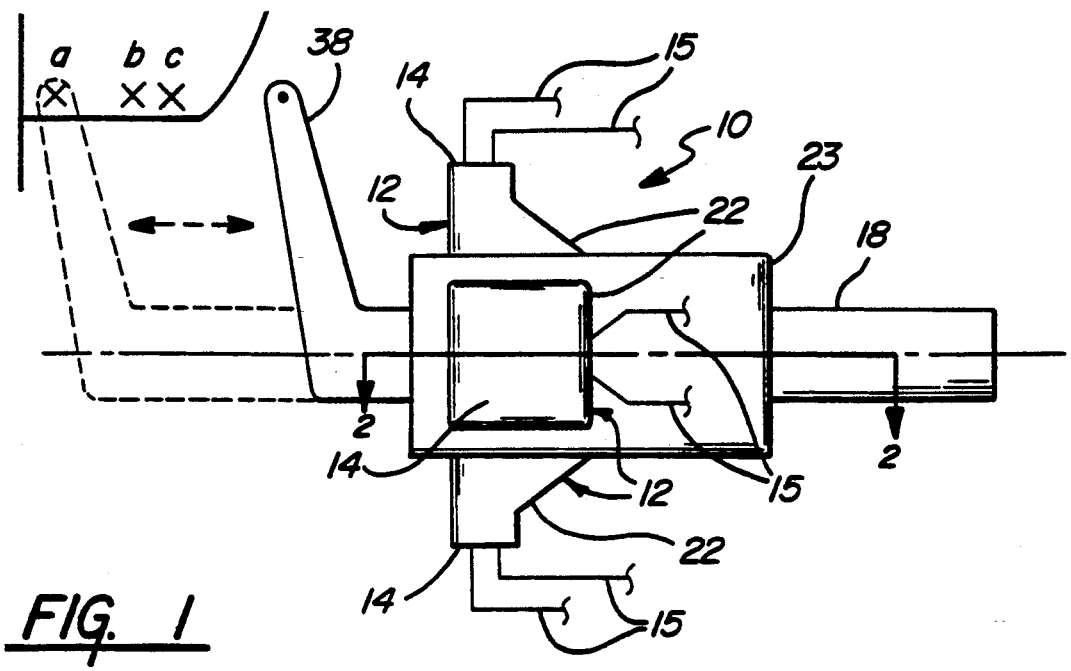
FIG. 1 is a side view of a weld gun apparatus made in accordance with the instant invention.

A roller linkage assembly of the type for locking a traveling member is generally shown at 10 in the Figures.

The assembly 10 includes actuating means generally indicated at 12. The actuating means or assembly 12 is for moving between a locked and an unlocked position. The actuating assembly 12 includes an actuation cylinder 14. The actuation cylinder 14 may comprise a hydraulic cylinder, pneumatic cylinder, or any actuation mechanism. The actuation cylinder 14 is energized through the supply lines 15. The supply lines 15 supply the cylinder 14 with hydraulic fluid or air. A piston 16 extends outwardly from the cylinder 14 and moves in response to a force applied thereto by the cylinder 14. The force requirement of the actuation cylinder is only that necessary to move a plurality of linkage elements 30, 32, 34 as will be described in greater detail subsequently.

The assembly 10 further includes traveling rail means 18. The traveling rail means 18 is supported for sliding movement when the actuating assembly 12 is in the unlocked position as viewed in FIG. 3. The traveling rail means 18 is stationary when the actuating assembly 12 is in the locked position, as best viewed in FIG. 2. The traveling rail means 18 comprises a traveling rail member 18 which is freely moveable when the actuating assembly is in the unlocked position.

The assembly 10 further includes locking means generally indicated at 20. The locking means or assembly 20 is disposed between the actuating assembly 12 and the traveling rail member 18. Specifically, the locking means 20 is disposed between the piston 16 and the traveling rail member 18. The locking assembly 20 is for locking engagement with the traveling rail member 18 in response to the actuating assembly 12 being moved to the locked position as best viewed in FIG. 2. The locking assembly 20 is also for maintaining the traveling rail member 18 in the locked position independently of the actuating assembly 12 when the actuating assembly 12 is in the locked position.

Specifically, the locking assembly 20 includes a housing 22 defining a passageway 24, 26, 28 therein. The actuation cylinder 14 is positioned adjacent or on the housing 22. A support structure 23 is also preferably provided. The housing 22 can be positioned at any of a variety of locations with respect to a support structure 23, as best viewed in FIG. 1. Further, any number of housings 22 can be positioned on a single support structure 23.

The passageway 24, 26, 28 includes a piston passageway 24. The piston passageway 24 extends generally perpendicular to the traveling rail member 18. The piston 16, which extends from the cylinder 14, extends into the piston passageway 24 and moves therein between the locked and unlocked positions. The passageway further includes a horizontal passageway 26 extending perpendicularly from the piston passageway 24. The horizontal passageway 26 extends generally parallel to and spaced from the traveling rail member 18. Thus, the horizontal passageway 26 extends perpendicular to the piston 16. Finally, the passageway includes a locking passageway 28. The locking passageway 28 extends perpendicularly from the horizontal passageway 26 at the opposite end of the horizontal passageway 26 from the piston passageway 24 and parallel to the piston passageway 24. The locking passageway extends from the horizontal passageway 26 to the traveling rail member 18.

The locking assembly 20 includes a plurality of linkage elements 30, 32, 34. Preferably, the linkage elements comprise first 30, second 32 and third 34 rollers. The rollers 30, 32, 34 are cylindrical, but may also be spherical. By utilizing rollers as the linkage elements, the frictional forces required to move the linkage elements are small. Furthermore, by utilizing rollers there is no need to connect the linkage elements.

The first roller 30 is surrounded or caged by the piston 16. More specifically, the piston 16 defines an opening for surrounding the first roller 30 and positively moving the first roller 30 in the piston passageway 24 as &:he piston 16 moves between the locked and the unlocked positions. That is, the first roller 30 is moveable with the piston 16 in the piston passageway 24. The force required by the piston 16 to move is the force necessary to move the rollers 30, 32, 34 from the unlocked to the locked positions.

The second roller 32 is disposed in and is moveable in the horizontal passageway 26. The second roller 32 moves from the unlocked position, as shown in FIG. 3, to the locked position, as shown in FIG. 2, in response to a force applied from the first roller 30 which moves with the piston 16.

The third roller 34 is moveable in the locking passageway 28. The third roller 34 is for engaging the rail 18 when the piston is in the locked position (as shown in FIG. 2) to prevent movement of the rail member 18.

When the assembly 10 is in the locked position (FIG. 2), all of the forces that are imparted to and transmitted by the traveling rail member 18 are confined by the walls defining the passageway 24, 26, 28. Thus, all the forces are prevented from being transmitted to the piston 16. Specifically, as shown in FIG. 2, if a force is applied to the traveling rail member 18 while the assembly 10 is in the locked position, the force is transmitted to the third roller 34, and this force is, in turn, placed on or confined by the walls defining the locking passageway 28, and the second roller 32. This force is confined by the walls defining the horizontal passageway 26 as it is transmitted through the second roller 32 to the first roller 30. Finally, because the longitudinal or horizontal axes of the first 30 and second 32 rollers align when in the locked position, the horizontal component of force is transmitted to the first roller 30. This is because the vertical component of the force is transmitted to or confined by the wall defining the horizontal passageway 26. Thus, the horizontal component of the force is transmitted through the first roller 30 and into the wall defining the piston passageway 24. Therefore, none of the force applied from the traveling rail member 18 is transmitted to the piston 16, and the actuator is unaffected by any force applied by the traveling rail member 18 when the assembly 10 is in the locked position. This is critical in that in the event of a power loss to the actuation cylinder 14, there will be no such loss in the locking force applied to the traveling rail member 18. In other words, the traveling rail member 18 will remain locked in the event of a power loss to the actuation cylinder 14, whether the power loss is intentional or accidental.

Figure 2:
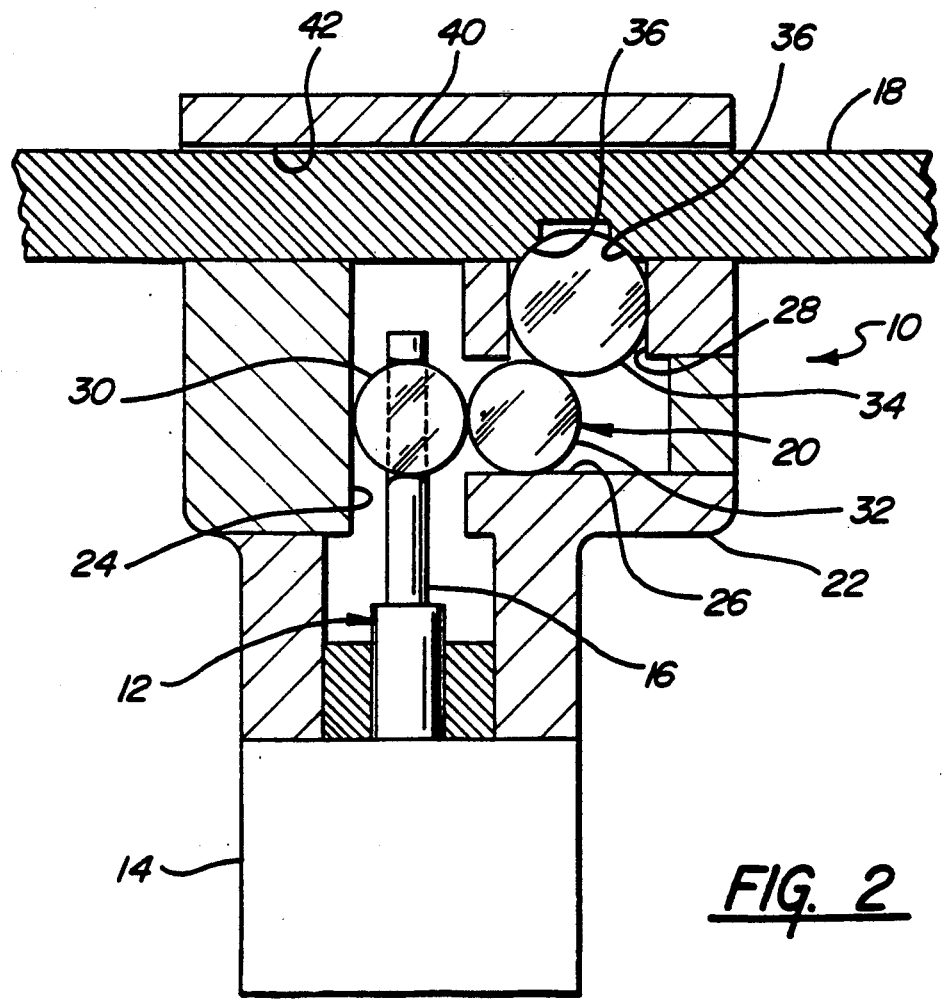
FIG. 2 is a cross sectional view taken along lines 2—2 of FIG. 1 of the linkage assembly of the present invention in the locked position.
Figure 3:
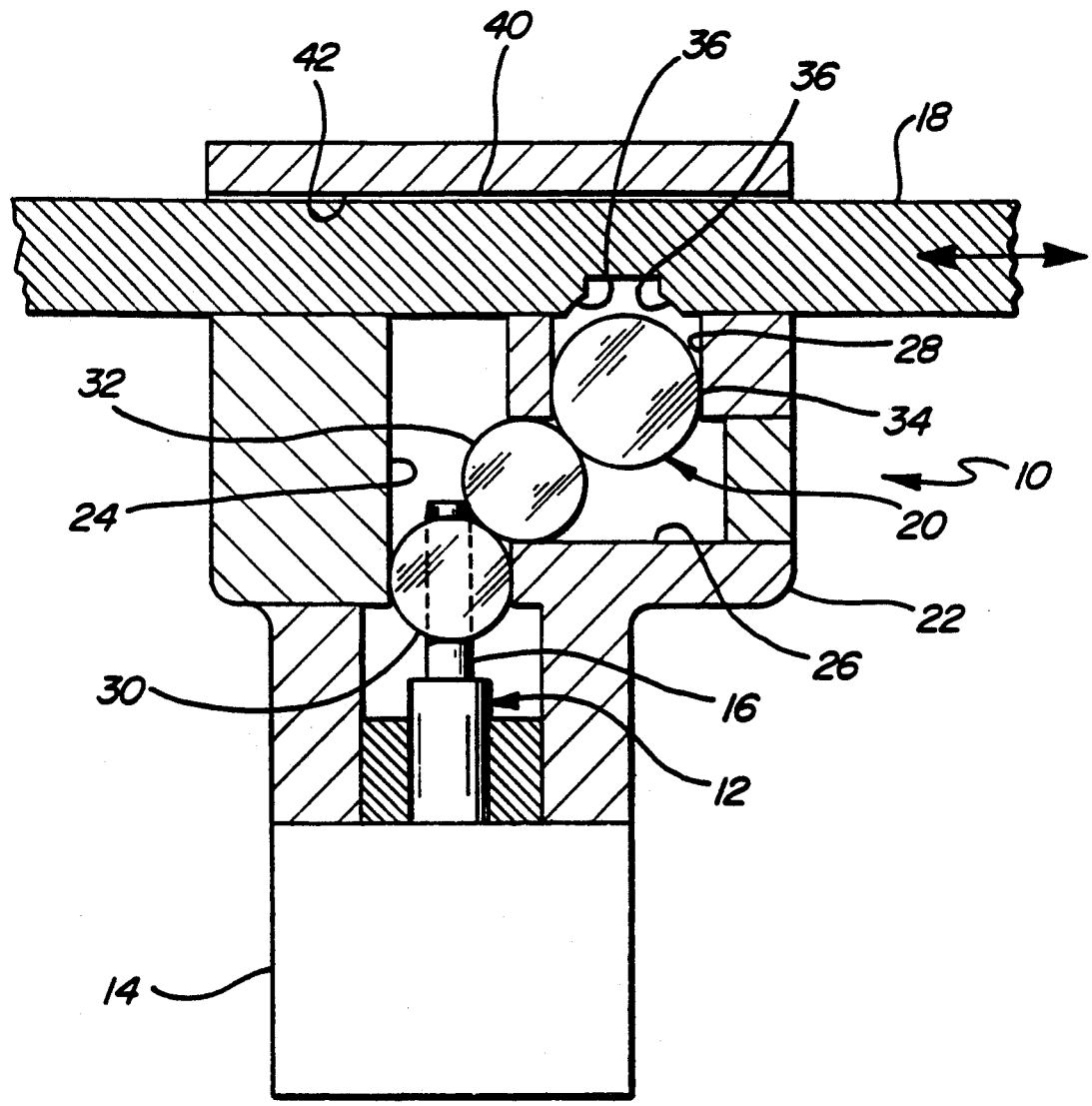
FIG. 3 is a cross sectional view of the linkage assembly of the present invention in the unlocked position.

The traveling rail member 18 has a plurality of notches 36 therein for receiving the third roller 34 when the assembly is in the locked position as shown in FIG. 2. Further, the traveling rail 18 has a fitting 38 thereon as best shown in FIG. 1. The fitting 38 may comprise any fitting but in the preferred embodiment, the fitting 38 comprises a weld gun. Finally, the assembly 10 includes a bearing plate 40. The bearing plate 40 and housing 22 define an opening 42 through which the traveling rail member 18 moves.

Operation of the assembly is as follows. Initially, the assembly 10 is in the unlocked position, as viewed in FIG. 3. In this position, the piston 16, and roller 30 moveable with the piston 16, are retracted. Similarly, the roller 32 and roller 34 are retracted. In this unlocked position, the traveling rail member 18 is free to move. The rail member 18 is moved through the opening 42 until the rail member 18 is in the desired position. By way of example, the traveling rail member 18 can be extended until the weld gun 38 is at the position "a" in FIG. 1. When the rail member 18 is at this position, the actuation cylinder 14 is energized and the piston 16 extends outwardly from the cylinder 14. This moves the roller 30 within the piston passageway 24. The piston 16 moves until the longitudinal axis or center of the first roller 30 aligns with the longitudinal axis of the second roller 32, as best shown in FIG. 2. Furthermore, this movement forces the third roller 34 into the notch 36 of the traveling rail member 18. In this locked position (FIG. 2), the traveling rail member 18 is locked and can not slide relative to the housing 22.

In order to move the traveling rail member 18 to the next desired location (position "b" in FIG. 1), the actuation cylinder is reversed and the piston 16 is retracted. To retract the piston 16, it is only necessary to overcome the single component of force transmitted to the first roller 30 by the rail member 18. This provides for an easier retraction of the piston 16. The traveling rail member 18 is then positively moved by an external force applied thereto. This force allows the third roller 34 to disengage the traveling rail member 18. That is, once the first roller 30 is retracted with the piston 16, a force applied by the traveling rail member 18 moves the third roller 34 out of engagement with the rail member 18. This, in turn, moves the second roller 32 to its retracted or unlocked position. As clearly viewed in FIG. 2, the second roller 32 does not extend directly below the third roller 34 when in the locked condition. That is, the axes of the second 32 and third 34 rollers do not align. By utilizing this design, there is no need to positively move the second roller 32 to move it to its unlocked position. All that is required is that the force from the third roller 34 be applied to the second roller 32 to move the second roller 32 from the locked to the unlocked position. The traveling rail member 18 can then be positioned in its next position (position "c" in FIG. 1) and the actuation cylinder 14 energized to repeat the process. Any number of actuation cylinders 14 and roller linkage assemblies can be used in accordance with the present invention. Further, the sequencing positioning the traveling rail 18 is independent of actuation of the subject roller linkage assembly. As shown by way of example only in FIG. 1, the sequence is to extend the weld gun to position "a", retract it to position "b", and then retract it to position "c". That is, the rail 18 can be extended or retracted to any desired location while the locking assembly is in the unlocked condition.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A roller linkage assembly (10) of the type for locking a traveling member (18) comprising:
   a housing (22) defining a passageway (24, 26, 28) therein;
   actuation means (12) disposed adjacent said housing 922) and having a piston (16) extending into said passageway (24,26,28), said piston (16) movable between a locked position and an unlocked position;
   a traveling rail member (18) movable adjacent said housing (22) when said piston (16) is in said unlocked position and stationary when said piston (16) is in said locked position;
   said assembly (10) characterized by including a plurality of linkage elements (30,32,34), disposed in said passageway (24,26,28) and between said piston (16) and said traveling rail member (18), said passageway (24,26,28) including a wall extending longitudinally of said actuation means (12), one of said linkage elements (34) engaging said traveling rail member (18) when said piston (16) is in said locked position for maintaining said traveling rail member (18) stationary such that forces applied by said traveling rail member (18) to said linkage elements (30,32,34) are transmitted through said linkage elements (30,32,34) to said wall of said passageway (24, 26, 28) when said piston (16) is in said locked position.

2. An assembly as set forth in claim 1 further characterized by one of said linkage elements (30) moveable with said piston (16) for moving at least one of said other linkage elements (34) into engagement with said traveling rail member (18) as said piston (16) is moved to said locked position.

3. An assembly as set forth in claim 2 further characterized by said plurality of linkage elements (30, 32, 34) comprising a plurality of rollers (30, 32, 34).

4. An assembly as set forth in claim 2 further characterized by said passageway (24, 26, 28) including a piston passageway (24), a horizontal passageway (26) extending perpendicularly from said piston passageway (26) and a locking passageway (24) extending perpendicularly from said horizontal passageway (26) and to said traveling rail member (18).

5. An assembly as set forth in claim 4 further characterized by said plurality of rollers (30, 32, 34) comprising first (30), second (32) and third (34) rollers, said first roller (30) movable in said piston passageway (24), said second roller (32) movable in said horizontal passageway (26), and said third roller (34) moveable in said locking passageway (28), said first (30) and said second (32) rollers aligning in said horizontal passageway (28) and said third roller (34) engaging said traveling rail means (18) when said piston (16) is in said locked position.

6. An assembly as set forth in claim 5 further characterized by said piston (16) defining an opening therein surrounding said first roller (30) for positively moving same in said piston passageway (24) as said piston (16) moves between said locked and said unlocked positions.

7. An assembly as set forth in claim 6 further characterized by said traveling rail member (18) having a plurality of notches (36) therein for receiving said third roller (34) when said piston (16) is in said locked position to prevent movement of said traveling rail member (18).

8. An assembly as set forth in claim 7 further characterized by said traveling rail member (18) having a fitting secured thereon.

9. An assembly as set forth in claim 8 further characterized by including a bearing plate (40) adjacent said traveling rail member (18).

* * * * *